April 30, 1946.   F. W. NYQUIST   2,399,448
SPEED INDICATOR
Filed Oct. 26, 1943
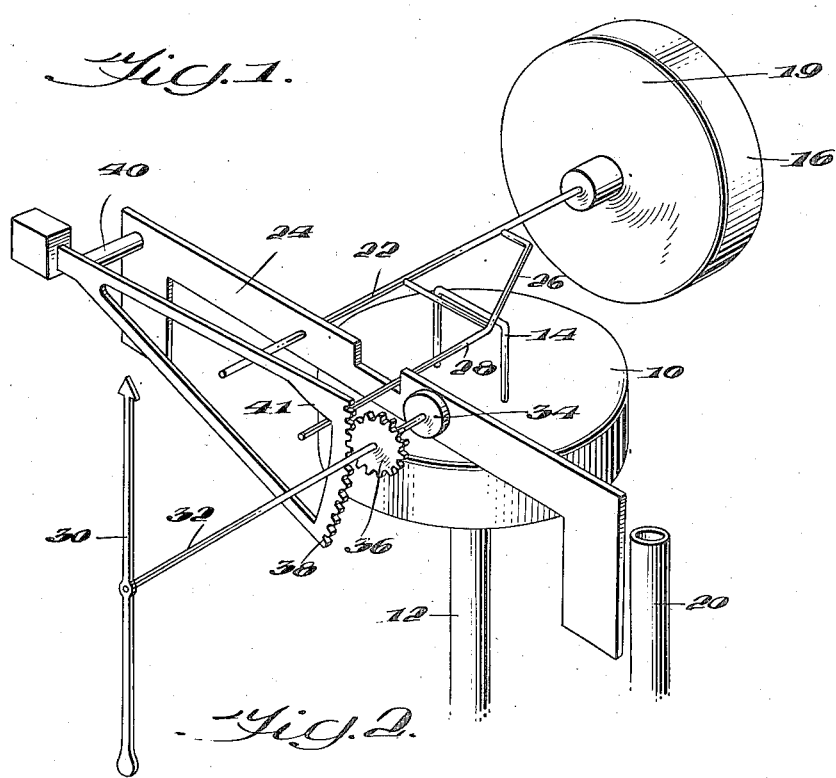
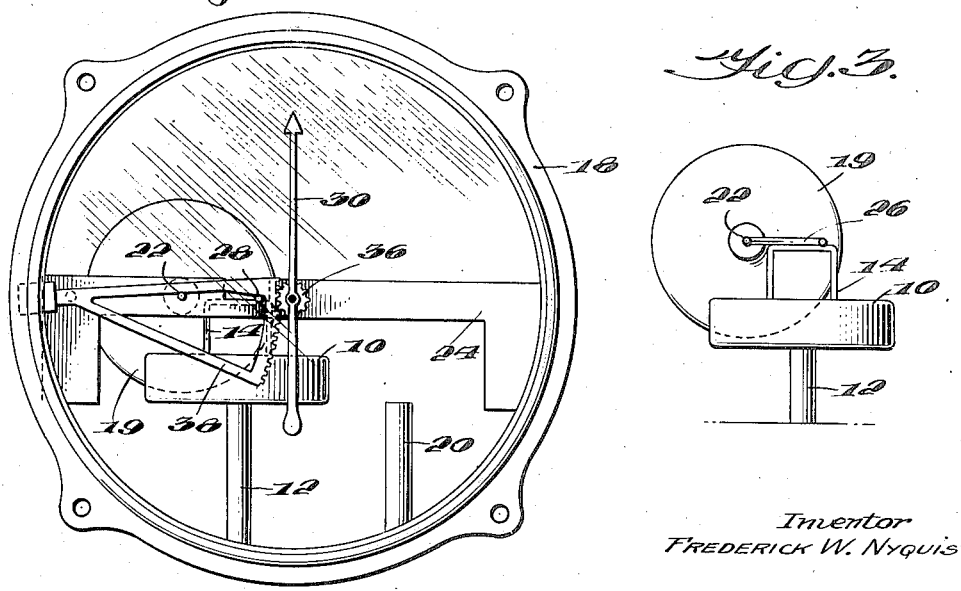
Inventor
FREDERICK W. NYQUIST,
By Henninger & Pillars
Attorney Patented Apr. 30, 1946

2,399,448

UNITED STATES PATENT OFFICE 2,399,448

SPEED INDICATOR

Frederick W. Nyquist, St. Paul, Minn.

Application October 26, 1943, Serial No. 507,702

6 Claims. (Cl. 73—205)

This invention relates to an instrument for indicating the speed of a fluid medium flowing relatively to the instrument. More particularly, the invention relates to pressure differential air speed indicators for aircraft.

Air speed indicators of the differential pressure type operate in accordance with the difference between the velocity pressure and static pressure of the air through which the aircraft is traveling. These differential pressures act upon pressure responsive devices within an instrument casing and they are obtained commonly by placing the interior of a dynamic pressure responsive device in communication with the pressure of the atmosphere through the medium of a Pitot tube or Venturi tube, while the static pressure of the atmosphere within the casing that houses the dynamic pressure responsive device is obtained through communication of the interior of the casing with a "static tube" that is usually closed at its end but is provided with a number of small holes that open to the atmosphere. These two tubes, the pressures within which are equal respectively to the velocity pressure and to the static pressure, are connected to the instrument which is designed to give an indication of air speed proportional to the differential of the two pressures.

The instruments of this general type are, however, usually not so designed as to compensate for several factors which are variable with different conditions of pressure, temperature, and air speed, and in practice it has become customary to use a special computing device or table for calculating the correct air speed for changes of pressure and temperature.

A few complicated arrangements have been heretofore suggested for giving a direct reading of the correct air speed on the face of the instrument dial and it is therefore the primary object of this invention to provide a differential pressure air speed indicator that is very simple in its construction and that will accurately compensate for pressure, temperature, and air speed conditions so that the true air speed may be read directly from the face of the instrument dial.

Other objects and advantages of the invention will become apparent as the description thereof is read with reference to the accompanying drawing in which:

Figure 1 is a perspective view of the parts constituting the instrument;

Figure 2 is a face view of the instrument enclosed in a casing from which the dial has been removed in order to show the location of the underlying parts; and Figure 3 is a detailed view showing the relation of the two pressure responsive devices constituting a part of the construction.

The instrument includes an aneroid or pressure responsive device 10, conventional in air speed indicators. The interior of the pressure responsive device 10 is connected with a Pitot tube (not shown) through tubing 12. The changing speed of the aircraft through the fluid medium of the atmosphere results in changing air pressures in the pressure responsive device 10 causing the diaphragm thereof to expand and contract, thereby moving an indicator actuating means or bridge 14 projecting from the outer face of the pressure responsive diaphragm.

A static pressure responsive device or diaphragm 16 is suitably supported within an instrument casing 18 wherein it is subjected to variations of atmospheric conditions within the instrument casing. The static pressure responsive device 16 is sealed against external atmosphere and movement of its diaphragm 19 is caused by drop or increase of the static pressure within the casing 18 as determined by the atmosphere entering through the static pressure tube 20.

A rod 22 is fixed for rotation to the face of the diaphragm 19 at one end thereof and the other end thereof projects through a bearing passage in an instrument frame 24. A compensating cam 26 is carried by the rod 22 and the cam 26 lies in contact with the indicator actuating means or bridge 14 so that angular movement is imparted thereto upon movement of the indicator actuating means 14 under the influence of the pressure responsive device 10.

The compensating cam 26 is a suitably curved surface arranged at a fixed displacement with respect to the axis of the rod 22, and the shape and displacement of the compensating cam 26 is predetermined as a function of the necessary correction for flight at different altitudes.

A compensating cam extension 28 is disposed in parallel relation with the rod 22 and the extension lies in operative contact with the indicating device. The face of the indicator actuating means or bridge 14 is disposed in perpendicular relation to the rod 22 at zero pressure differential or zero air speed. Therefore, when the shape and displacement of the compensating cam 26 is properly fixed with respect to the rod 22, the corrected angular movement of the cam extension 28 becomes automatic for any axial position of the rod 22 which position is effective to alter the point of contact between the indicator actuating means or bridge 14 and the surface of the compensating cam 26 thereby immediately imparting a corrected movement to the indicating device.

The indicating device in its preferred form includes a rotatable pointer 30 which is adapted to sweep over a graduated dial for visually indicating the corrected air speed readings. The pointer 30 is carried by a pointer shaft 32 which is mounted for rotation in a bearing in the frame member 24. A suitable spring 34 is operative to return the pointer to its zero position. Suitably fixed to the pointer shaft 32 is a drive gear 36 which is operated through its contact with a gear segment 38 suitably journaled for angular movement in a bearing 40 carried by the frame member 24. The gear segment is in the form of a frame into which the cam extension 28 extends and against a surface of which the cam extension is adapted to bear so that angular movement of the cam extension 28 under the influence of movement of the indicator actuating means 14 will impart movement to the gear segment 38 and through it to the gear 36, thereby moving the pointer 30 over the face of the dial.

As the air speed to be measured increases, the pressure differential increases and the indicator actuating bridge 14 is displaced by an amount proportional to the pressure differential. This will cause the shaft 22 to turn through an angle whose sine is proportional to the displacement of bridge 14. The amount of displacement of the diaphragm face 19 from the normal depends on the static pressure which varies at different altitudes of the airplane. As the altitude increases, the diaphragm face 19 expands, causing a different portion on the compensating cam 26 to ride on the indicator actuating bridge 14. Assuming that the point of the compensating cam 26 in contact with the indicator actuating bridge 14 is at unit distance from the rod 22 at zero altitude, a distance from rod 22 of the point of the compensating cam 26 in contact with the actuating bridge 14 at different altitudes will be the reciprocal of the correction factor required for that altitude. This will cause the shaft 22 to turn through an angle whose sine is proportional to the correction factor applied. Therefore, for any given air speed, no matter what the altitude, the shaft 22 will revolve through a definite angle. It may be noted that according to the laws of physics the amount of head pressure is proportional to the square of the velocity. Therefore, the displacement of the actuator bridge 14 is proportional to the square of the air speed and to make corrections for this condition, it is necessary to design the compensating cam 26 so that the radius thereof from the rod 22 at any given altitude is equal to the reciprocal of the square of the amount of correction necessary shown in conventional correction tables. This correction may include both correction for decrease in pressure as altitude increases as well as correction for the normal decrease in temperature as the altitude increases.

The drive for the indicating hand or pointer 30 is herein illustrated in its preferred form because by means of this arrangement the angular displacement of pointer 30 can be varied with different angular displacements of shaft 22. To accomplish this, the gear segment 38 is provided with a cam surface 41 which is developed to provide the desired pointer movement. For example, the pointer 30 can be made to move through twice the angle for twice the displacement of actuator bridge 14 rather than through an angle whose sine is twice as great as does shaft 22. Or the cam 41 may within limitations be of any desired shape to impart variations to the pointer movement as, for example, to obtain a spread of the dial readings at any particular range of flying speeds as desired. Note that it is not essential to employ a special cam surface 41 since the instrument will operate as intended when it is properly calibrated no matter what the shape of the surface 41 may be.

Having now described my invention in its preferred form, what I claim as new and desire to secure by Letters Patent of the United States is:

1. In an instrument for measuring the flow of a fluid having a pressure dependent density, a device responsive to the flow of fluid, an indicating device, a device responsive to the static pressure of said fluid, a rotatable rod carried by said static pressure responsive device, an indicator actuating means carried by said fluid flow responsive device and disposed in perpendicular relation to said rod at zero air speed, a compensating cam fixed to said rod and lying in contact with said actuating means, a compensating cam extension in parallel relation to said rod and lying in operative contact with said indicating device whereby angular movement of said extension is effective to impart movement to said indicating device, said compensating cam being suitably shaped and disposed at a fixed predetermined displacement with respect to said rod, whereby longitudinal movement of said rod under the influence of said static pressure responsive device is effective to vary the point of contact between said actuating means and said compensating cam.

2. In an instrument for measuring the flow of a fluid having a pressure dependent density, a device responsive to the flow of fluid, an indicating device including a rotatable pointer, a gear for rotating said pointer, and a pointer displacement cam surface on said gear, a device responsive to the static pressure of said fluid, an indicator actuating means carried by said fluid flow responsive device, a compensating cam rotatably carried by and extending axially from said static pressure responsive device and having a surface lying in contact with said actuating means, a compensating cam extension in operative contact with the cam surface on said gear whereby angular movement of said extension is effective to impart movement to said pointer, the indicator actuating means contacting surface of said cam being disposed at a fixed predetermined angle with respect to said actuating means whereby axial movement of said compensating cam under the influence of said static pressure responsive device is effective to vary the point of contact between said actuating means and said compensating cam.

3. In an instrument for measuring the flow of a fluid having a pressure dependent density, a device responsive to the flow of fluid, an indicating device including a rotatable pointer, a gear for rotating said pointer and a cam surface on said gear, a device responsive to the static pressure of said fluid, a rotatable rod extending axially from said static pressure responsive device, an indicator actuating means carried by said fluid flow responsive device in perpendicular relation to said rod at zero air speed, a compensating cam fixed to said rod and having a surface lying in contact wtih said actuating means, a compensating cam extension in parallel relation to said rod and lying in operative contact with the cam surface on said gear whereby angular movement of said extension is effective to impart movement to said indicating device, the indicator actuating means contacting surface of said cam being disposed at a fixed predetermined angle with respect to said actuating means whereby axial movement of said compensating cam under the influence of said static pressure responsive device is effective to vary the point of contact between said actuating means and said compensating cam.

4. In an instrument for measuring the flow of a fluid having a pressure dependent density, a device responsive to the flow of fluid, an indicating device including a rotatable pointer and a gear for rotating said pointer, a device responsive to the static pressure of said fluid, an indicator actuating means having a contact surface carried by said fluid flow responsive device, a compensating cam rotatably carried by and extending axially from said static pressure responsive device and having a surface lying in contact with the contact surface of said actuating means, a cam surface extension disposed at a right angle with respect to the contact surface of said actuating means and lying in operative contact with said gear whereby angular movement of said extension is effective to impart movement to said pointer, the indicator actuating means contacting surface of said cam being disposed at a fixed predetermined angle with respect to said actuating means whereby axial movement of said compensating cam under the influence of said static pressure responsive device is effective to vary the point of contact between said actuating means and said compensating cam.

5. In an instrument for measuring the flow of a fluid having a pressure dependent density, a device responsive to the flow of fluid, an indicating device including a rotatable pointer and a gear for rotating said pointer, a device responsive to the static pressure of said fluid, an indicator actuator means carried by said fluid flow responsive device, a compensating cam support rotatably carried by and extending axially from said static pressure responsive device, a compensating cam carried by said support and having a surface lying in contact with said actuating means, a cam surface extension disposed in parallelism with the axis of said cam support and lying in operative contact with said gear whereby angular movement of said extension is effective to impart movement to said pointer, the indicator actuating means contacting surface of said cam being disposed at a fixed predetermined angle with respect to said actuating means whereby axial movement of said compensating cam under the influence of said static pressure responsive device is effective to vary the point of contact between said actuating means and said compensating cam.

6. In an instrument for measuring the flow of a fluid having a pressure dependent density, a device responsive to the flow of fluid, an indicating device, a device responsive to the static pressure of said fluid, an indicator actuator means carried by said fluid flow responsive device, a rotatable rod disposed perpendicularly to said indicator actuating means carried by and extending axially from said static pressure responsive device, a compensating cam carried by said rod and having a surface lying in contact with said actuating means, a compensating cam extension in operative contact with said indicating device whereby angular movement of said extension is effective to impart movement to said indicating device, the indicator actuating means contacting surface of said cam being disposed at a fixed predetermined angle with respect to said actuating means, whereby axial movement of said compensating cam under the influence of said static pressure responsive device is effective to vary the point of contact between said actuating means and said compensating cam.

FREDERICK W. NYQUIST.